Patented Feb. 8, 1938

2,107,298

UNITED STATES PATENT OFFICE 2,107,298

INSECTICIDE

Lowell B. Kilgore, Washington, D. C., assignor to Kilgore Development Corporation, East Falls Church, Va., a corporation of Virginia No Drawing. Application March 27, 1934, Serial No. 717,676

11 Claims. (Cl. 167—22)

This invention relates to insecticides and has for its general object the provision of a solution or emulsion which has the power of killing insects and yet is harmless to other animal life. More particularly, this invention concerns an emulsion or solution which contains one or more organic compounds which have as a part of their molecular structure a particular tautomeric methylene hydrogen atom, namely, one situated between two keto carbonyl groups. Specifically, I have discovered a means of killing insects by a chemical reaction which reaction is caused by bringing into contact with an insect an insecticide containing an organic compound having such a tautomeric methylene hydrogen atom positioned between two keto-carbonyl groups or between one keto-carbonyl group and an electronegative radical.

The mechanism by which an insect utilizes the oxygen of the air and particularly the chemistry of the transfer of the oxygen to the places of ultimate combustion are different from the processes which occur in red blooded animals. The insect must permit the diffusion of molecular oxygen through the walls of the tracheae and during this diffusion or later this molecular oxygen must be broken down to atomic form and attached to a suitable carrying compound for distribution to the cell walls.

My invention, therefore, consists of an insecticide containing an organic chemical compound which appears to be able to compete for the labile oxygen involved in the oxygen transfer system of an insect thus interfering with the means of energizing the life sustaining processes.

I do not consider the theory of the action of this particular tautomeric hydrogen contained in the compounds which I have discovered to be toxic to insect life, to be essential to my invention, but it is set forth here to illustrate the broad conception of my invention, and the scientific teachings appurtenant thereto.

I have discovered that the incorporation into an organic compound of a methylene group in which the hydrogens are labile and capable of migrating to another position in the molecule, confers upon this organic compound the power to kill insects. The hydrogens in the type of methylene group, —CH$_2$—, to which I refer, are caused to be labile and migratory by the electronic strain produced by neighboring activating groups. This electronic strain or activation is caused by the presence of a keto carbonyl, C=O, group on each side of the intervening methylene group or by the presence of one keto carbonyl group on one side and is strongly electronegative radical or group on the other side. A study of the examples which are given below will show exactly what is included and meant in the above theory fundamental to the class of organic compounds which I have discovered to be efficient insecticides.

The migratory nature of the hydrogen atoms contained in the active methylene grouping to which I have herein referred and described, is shown by the tendency of these hydrogen atoms to enter into enol-keto dynamic tautomerism. This tautomerism is represented as follows:

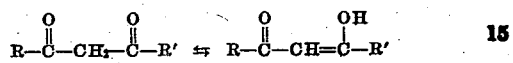

Here the migratory or active hydrogen atom shifts between the carbonyl and the methylene carbon atoms accompanied by a shift in the double bond linkage in the opposite direction. When the hydrogen atom is in the "enol" position it is able to react with the oxygen atom of another molecule of the same or of another compound provided the oxygen atom is loosely bound. When such an "enol" compound is brought in contact with the respiratory or combustion system of an insect, a reaction takes place which paralyzes and subsequently kills the insect.

The tautomeric group which I have found to be necessary in the molecular structure of those organic compounds upon which my invention depends is characterized by the following reactions which must be considered together:

(1) The tautomeric group wherein the "enol" structure produces a deep red color complex with ferric chloride.

(2) The methylene hydrogens are replaceable with an alkyl radical through the intermediary of a sodium alkoxide.

The incorporation of such an active methylene radical so positioned between two keto-carbonyl groups which confers upon the organic compound insecticidal properties is illustrated by the beta di-ketones and substitution products thereof such as is shown below. The fundamental structure which is operative in the compounds to which I refer is represented generically,

wherein R and R' may or may not be same radical or grouping.

I have selected the following compounds from my researches as illustrative of the requisite molecular structure which according to my discovery confers insecticidal properties upon an organic compound. Each one of the following compounds has been bio-assayed against insects and has been found to possess insecticidal properties.

Compounds toxic toward insects (1) Acetyl acetone _____ $CH_3CO-CH_2-COCH_3$
(2) Dibenzoyl methane _____ $C_6H_5CO-CH_2COC_6H_5$
(3) Benzoyl acetone _____ $C_6H_5COCH_2COCH_3$
(4) Ethyl acetyl pyruvate ____ $CH_3CO-CH_2-COCOOC_2H_5$
(5) Ethyl benzoyl pyruvate __ $C_6H_5CO-CH_2-COCOOC_2H_5$ The above compounds were selected to illustrate the diversity of compounds possible wherein the essential structure operative in conferring insecticidal properties upon such a compound is a methylene group positioned between two keto-carbonyl groups as an integral part of its structure.

The following analysis of the structural relationships of the compounds given in the above group are pointed out to indicate the broad scope of the invention and the possibilities which are apparent.

In the first place it will be noted that all of the above compounds have as a part of their molecular structure a methylene radical positioned between two keto-carbonyl groups. Stated in another way, all of these compounds are closely related in that each one contains two keto-carbonyl groups separated by a methylene radical as a characteristic part of their structures, thus:

Compound (1) illustrates the use of an alkyl radical for both R and R' in the generic formula,

In a similar way Compound (2) shows the use of an aryl radical for both R and R' in the general formula. The use of a combination of aryl and alkyl radicals as substituents for R and R' of the general formula is shown in Compound (3).

Compounds (4) and (5) show that these substituents may be other types of groups or radicals as in the incident examples, an esterified carboxyl group wherein R or R''=COOH(R'')

In Compound (4) an alkyl radical is used for both R's, while in (5) aryl and alkyl radicals are used for R and R'' respectively in this subclass of the general formula:

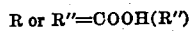

It will be noted that Compounds (1), (2) and (3) are usually prepared by the Claisen condensation of a ketone and a monobasic ester, ethyl acetate, according to the general reaction,

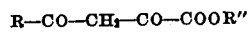

Such products are often classed as beta-ketones.

Similarly in the case of Compounds (4) and (5) the same condensation reaction, namely, by means of metallic sodium, is used employing a dibasic acid ester, ethyl oxalate, and a ketone, thus:

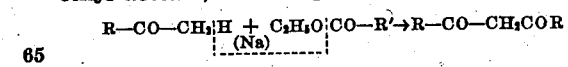

These compounds are often classed as alpha gamma diketo esters.

The condensation therefore of a ketone with an organic ester effected by metallic sodium is the general method of preparation of the beta diketones referred to in this invention.

The compounds herein listed were biologically tested for insecticidal activity using roaches and flies as the test animals. A one percent solution of each of the compounds in kerosene was used in each instance. The application was made by dropping one drop of the solution on the abdomen of the roach in accordance with the standard test method, (see Gnadinger, C. B. "Pyrethrum Flowers", pp. 88 ff.). In each case a paralysis of the hind legs developed in about ten minutes. This was followed by a complete paralysis in which state the roach became unable to move, the legs being drawn up in an irregular fashion. Although signs of life persisted in some cases for many hours, there were no recoveries.

The rate of action depended upon the virility of the roach and the specific compound used. For example, acetyl acetone was found to be rapid in its toxic effect while ethyl benzoyl pyruvate was comparatively slow in action. Nevertheless, it was fatally toxic eventually. The higher the percentage of the enol tautomer, the faster the action appears to be.

The fly tests were conducted by atomizing a one percent solution of acetyl acetone in kerosene into a group of five day old flies contained in a small cage. About 0.3 cc. of the spray was used and after three minutes the flies were transferred to a dry cage for observation. All the flies were found to be dead after twenty-four hours.

What I claim is:

1. An insecticide comprising in solution an organic compound the molecular structure of which has the following tautomeric grouping as an integral part thereof;

2. An insecticide comprising in solution with an organic solvent, an organic compound the molecular structure of which has the following tautomeric grouping as an integral part thereof;

3. An insecticide adapted to be applied through the intermediary of a sprayable vehicle, comprising an organic compound having as part of its molecular structure a methylene group positioned between two keto-carbonyl groups wherein a hydrogen atom is labile and migratory.

4. Insecticide comprising an organic compound having as part of its molecular structure a methylene group having a tautomeric hydrogen atom, and a keto-carbonyl group on each side of said methylene group by the presence of which groups the intervening hydrogen atoms are rendered labile and migratory.

5. An insecticide adapted to be applied through the intermediary of a sprayable liquid vehicle, comprising an organic compound having as part of its molecular structure a methylene radical positioned between two keto-carbonyl groups by virtue of which position a hydrogen atom of said methylene radical becomes labile and migratory so as to permit the formation of the corresponding enol form.

6. An insecticide comprising an alpha, gamma, diketo ester.

7. An insecticide comprising a beta-diketone.

8. An insecticide comprising in a sprayable liquid vehicle, an alpha, gamma, diketo ester.
9. An insecticide comprising in a sprayable liquid vehicle a beta-diketone.
10. An insecticide comprising dibenzoyl methane, $C_6H_5CO-CH_2-COC_6H_5$.
11. An insecticide comprising an organic compound having as part of its molecular structure, a methylene radical interposed between two keto carbonyl radicals forming a group which is subjected to an electronic strain causing the methylene hydrogen atoms to become labile and migratory.

LOWELL B. KILGORE.